(12) United States Patent
Yang

(10) Patent No.: US 7,369,318 B2
(45) Date of Patent: May 6, 2008

(54) COLOR DISPLAY DEVICE HAVING SINGLE ILLUMINATING SYSTEM

(75) Inventor: Haeng Seok Yang, Gyeonggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 316 days.

(21) Appl. No.: 11/158,297

(22) Filed: Jun. 21, 2005

(65) Prior Publication Data
US 2006/0119943 A1   Jun. 8, 2006

(30) Foreign Application Priority Data
Dec. 2, 2004   (KR) ................. 10-2004-0100570

(51) Int. Cl.
*G02B 27/12*   (2006.01)
*G02F 1/00*   (2006.01)
*H04N 5/74*   (2006.01)
*G03B 21/28*   (2006.01)

(52) U.S. Cl. .................. 359/640; 348/750; 353/81
(58) Field of Classification Search ............... 359/204, 359/573, 629, 630, 631, 638, 639, 640; 345/7–9; 348/750; 353/20, 46–51, 81
See application file for complete search history.

(56) References Cited

U.S. PATENT DOCUMENTS

| | | | | |
|---|---|---|---|---|
| 5,237,435 A | * | 8/1993 | Kurematsu et al. | 349/8 |
| 5,374,947 A | | 12/1994 | Takahashi et al. | |
| 6,764,183 B2 | * | 7/2004 | Okazaki | 353/31 |
| 2006/0119941 A1 | * | 6/2006 | Yang et al. | 359/566 |
| 2006/0119942 A1 | * | 6/2006 | Yang et al. | 359/566 |

* cited by examiner

*Primary Examiner*—Alessandro Amari
(74) *Attorney, Agent, or Firm*—Christensen O'Connor Johnson Kindness PLLC

(57) ABSTRACT

A display device is disclosed herein. The display device includes a condenser unit, an illumination lens system, an optical modulation system, a filter system and a projection system. The condenser unit converges polarized light output from a plurality of light sources, and outputs the converged polarized light. The illumination lens system converts the polarized light into linear parallel light. The optical modulation system produces diffracted light beams having a plurality of diffraction orders by optically modulating the polarized light. The filter system passes some of the diffracted light beams having desired orders therethrough. The projection system focuses the diffracted light beams passed through the filter system, and projects the focused diffracted light beams onto a screen.

3 Claims, 10 Drawing Sheets

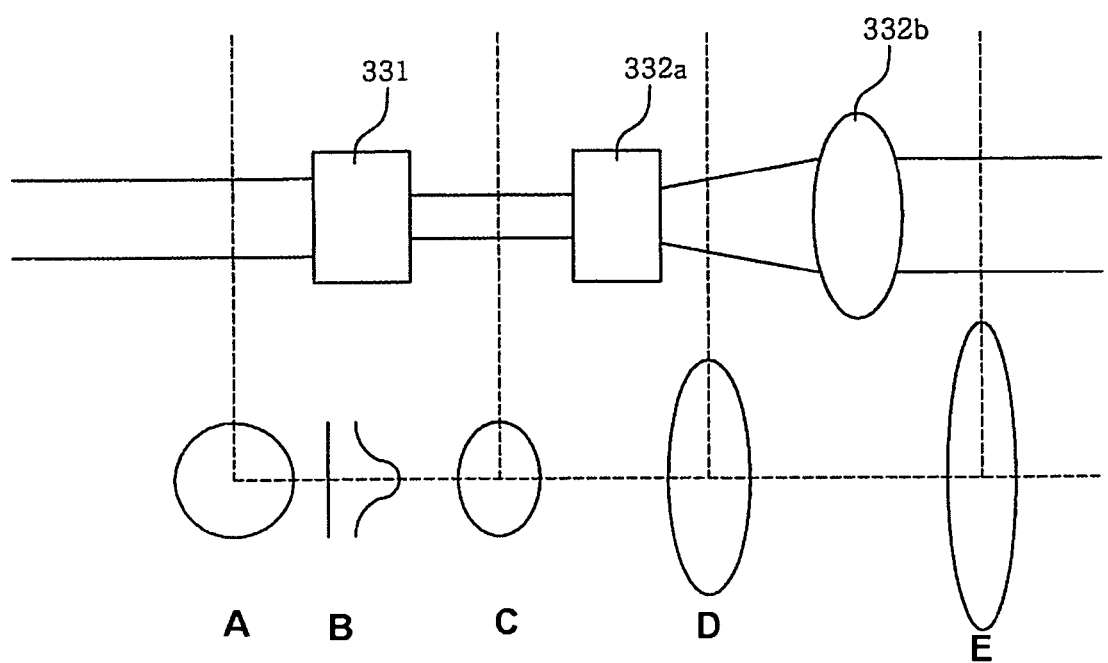

COLOR DISPLAY DEVICE HAVING SINGLE ILLUMINATING SYSTEM

BACKGROUND OF THE INVENTION

1. Field of the Invention

The present invention relates generally to a color display device and, more particularly, to a color display device that is provided with a single illumination system through the use of polarized beams.

2. Description of the Related Art

A light beam scanning apparatus is an apparatus for producing an image by causing a light beam to form spots on a photosensitive medium through scanning in an image forming apparatus such as a laser printer, a display device, a Light Emitting Diode (LED) printer, an electrophoto copying machine or a word processor.

As image forming apparatuses develop toward compactness, high speed and high resolution, light beam scanning apparatuses have been accordingly researched and developed to have the characteristics of compactness, high speed and high resolution.

Light beam scanning apparatuses for image forming apparatuses may be mainly classified into laser scanning type apparatuses using an f·θ lens, and image head printer type apparatuses, according to the light beam scanning method and the construction of a light beam scanning apparatus.

FIG. 1 is a perspective view showing the configuration of a conventional laser scanning apparatus using an f·θ lens.

Referring to FIG. 1, the conventional laser scanning apparatus includes a Laser Diode (LD) 10 that radiates a light beam in response to a video signal, a collimator lens 11 that converts the light beam, which is radiated from the LD 10, into parallel light, a cylinder lens 12 that converts the parallel light, which is passed through the collimator lens 11, into linear light coplanar with a scanning direction, a polygon mirror 13 that reflects the linear light, which is passed through the cylinder lens 12, while moving it at a constant linear velocity, a polygon mirror driving motor 14 that rotates the polygon mirror 13 at a constant velocity, an f·θ lens 15 that has a constant refractive index with respect to an optical axis, deflects the light, which is reflected by the polygon mirror 13 and which has a constant angular velocity, in a principal scanning direction, corrects aberrations of the light and focuses the corrected light on an illumination surface, a reflection mirror 16 that reflects the light beam, which is passed through the f·θ lens 15, in a predetermined direction and forms a dot-shaped image on the surface of a photosensitive drum 17, that is, an image plane, a horizontal sync mirror 18 that reflects the laser beam, which is passed through the f·θ lens 15, in a horizontal direction, and an optical sensor 19 that receives the laser beam, which is reflected by the horizontal sync mirror 18, and performs synchronization.

It is difficult for the above-described laser scanning type light beam scanning apparatus to achieve high-speed printing, due to the low switching speed of the laser diode 10 and the speed problem of the polygon mirror 13.

That is, to increase the scanning speed of the light beam, the polygon mirror 13 must be rotated using a high-speed motor. However, the high-speed motor is expensive, and the motor operating at high speed generates heat, vibration and noise, thus degrading operational reliability, so that a significant improvement in scanning speed cannot be expected.

Another scheme for improving the speed of the light beam scanning apparatus relates to an image head printing type light beam scanning apparatus using a multi-beam type beam formation apparatus.

Such a multi-beam optical scanning apparatus has a plurality of light emitting parts (laser heads) as light sources. The multi-beam optical scanning apparatus optically scans the surface of a recording medium using a plurality of light spots formed on the surface of the recording medium in such a way that a plurality of light beams radiated from the plurality of light emitting parts is focused by an imaging lens through an optical reflector.

In order to accomplish high-speed printing using only a single light spot, the number of times the surface of the recording medium is optically scanned per unit time must be significantly large. Meanwhile, the rotational speed of the optical reflector and the image clock cannot comply with the large number of optical scans. Accordingly, if the number of beam spots that simultaneously scan the surface of the recording medium increases, the rotational speed of the optical reflector and the image clock may be reduced in proportion to the number of beam spots.

In order to form a plurality of beam spots in the most effective manner, a laser element that functions as a light source has a plurality of light emitting points (light emitting parts) that can be independently operated.

Such a laser element having a plurality of light emitting points is commonly called a "monolithic multi-beam laser element." When the monolithic multi-beam laser element is used, most of optical elements disposed behind the light source can be used for a plurality of light beams, so that the monolithic multi-beam laser element provides significant advantages in terms of cost, process and control.

FIG. 2 is a view illustrating a conventional laser scanning scheme in which laser scanning is performed by a plurality of beams produced by an LED array disposed in an image head.

Referring to FIG. 2, an LED array 21 is disposed in an image head 20 to have LEDs that can cover the width of printing paper, and generates a plurality of beams. Unlike the laser scanning scheme, printing can be performed on a line-at-a-time basis without using a polygon mirror or an f·θ lens, thus significantly improving printing speed.

This monolithic multi-beam laser element includes a so-called surface emitting laser (surface emitting type semiconductor laser).

The surface emitting laser emits light beams parallel to the thickness direction of a silicon layer, whereas a conventional semiconductor laser emits light beams perpendicular to the thickness direction of a silicon layer.

Furthermore, the surface emitting laser has the following characteristics. That is, the conventional semiconductor laser emits divergent light that has an elliptical cross section and considerably varied divergence angles, whereas the surface emitting laser can emit a circular beam that has a stabilized divergence angle.

However, the surface emitting laser has a problem in that an output light beam has an unstable polarization direction. Although the polarization direction can be controlled by the manufacturing method to some degree, it varies depending upon a light emitting point, ambient temperature and output.

The reflectance, transmittance and angle characteristics of the optical elements of an optical scanning apparatus, such as a polygonal mirror like an optical reflector, the scanning lens (f·θ lens) of an optical imaging system, and an echo mirror for changing an optical path, vary depending upon the polarization direction of an input light beam.

For this reason, when the monolithic multi-beam laser element including a surface emitting laser is used as the light source of an optical scanning apparatus, a plurality of beam spots that optically scans the surface of a recording medium have different intensities due to the different polarization directions of light emitting points. Further, the difference in intensity results in irregular pitch in an image, thus considerably degrading image quality.

SUMMARY OF THE INVENTION

Accordingly, the present invention has been made keeping in mind the above problems occurring in the prior art, and an object of the present invention is to provide a color display device that is provided with a single illumination system through the use of polarized beams.

In order to accomplish the above object, the present invention provides a display device, including a condenser unit for converging polarized light output from a plurality of light sources, and outputting the converged polarized light; an illumination lens system for converting the polarized light, which is output from the condenser unit, into linear parallel light; an optical modulation system for producing diffracted light beams having a plurality of diffraction orders by optically modulating the polarized light having each wavelength that is output from the illumination lens system; a filter system for passing some of the diffracted light beams having desired orders therethrough; and a projection system for focusing the diffracted light beams passed through the filter system, and projecting the focused diffracted light beams onto a screen.

BRIEF DESCRIPTION OF THE DRAWINGS

The above and other objects, features and advantages of the present invention will be more clearly understood from the following detailed description taken in conjunction with the accompanying drawings, in which:

FIGS. 4a to 4c are a perspective view, a plan view, a side sectional view and a cross section showing an optical path produced through the illumination lens of FIG. 3, respectively;

DESCRIPTION OF THE PREFERRED EMBODIMENTS

The construction of a color display device having a single illumination system according to the present invention is described with reference to the accompanying drawings below.

Figure 1:
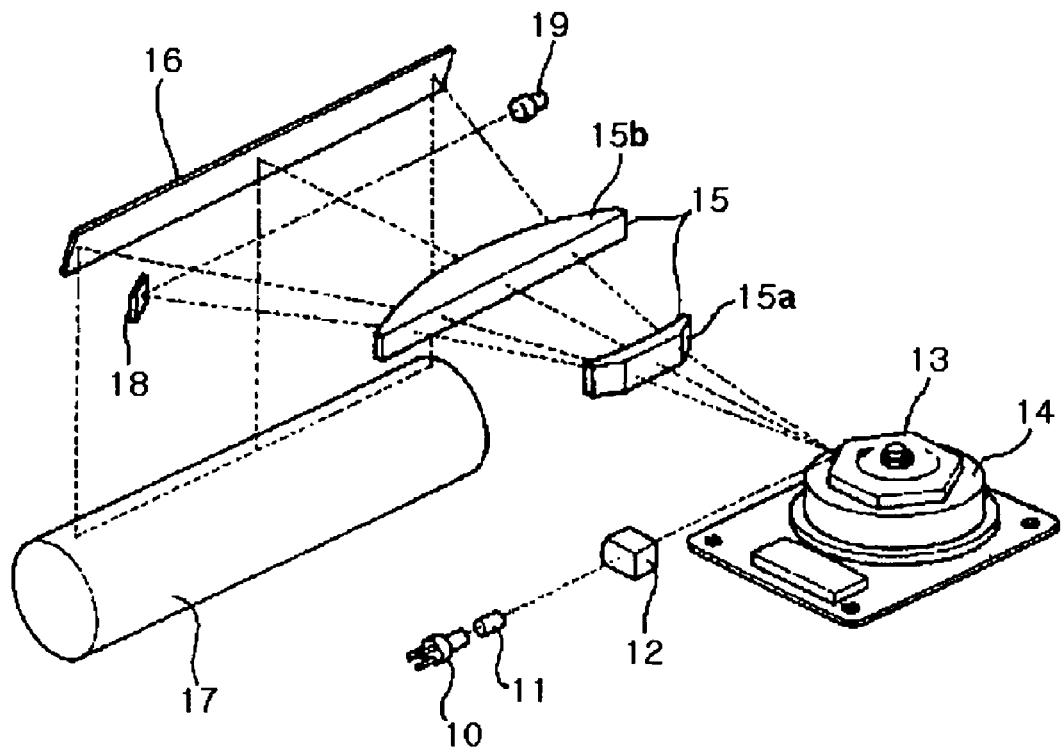
FIG. 1 is a perspective view showing the construction of a conventional laser scanning apparatus using a single light source and an f·θ lens.
Figure 2:
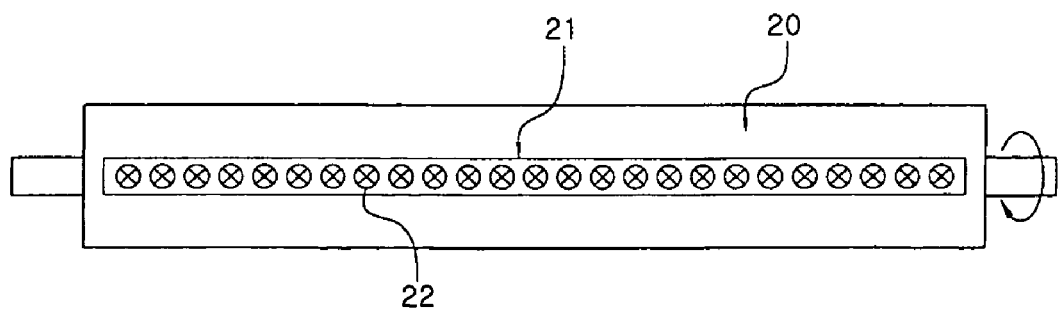
FIG. 2 is a view showing a conventional laser scanning scheme in which laser scanning is performed by a plurality of beams produced by an LED array formed in an image head.
Figure 3:
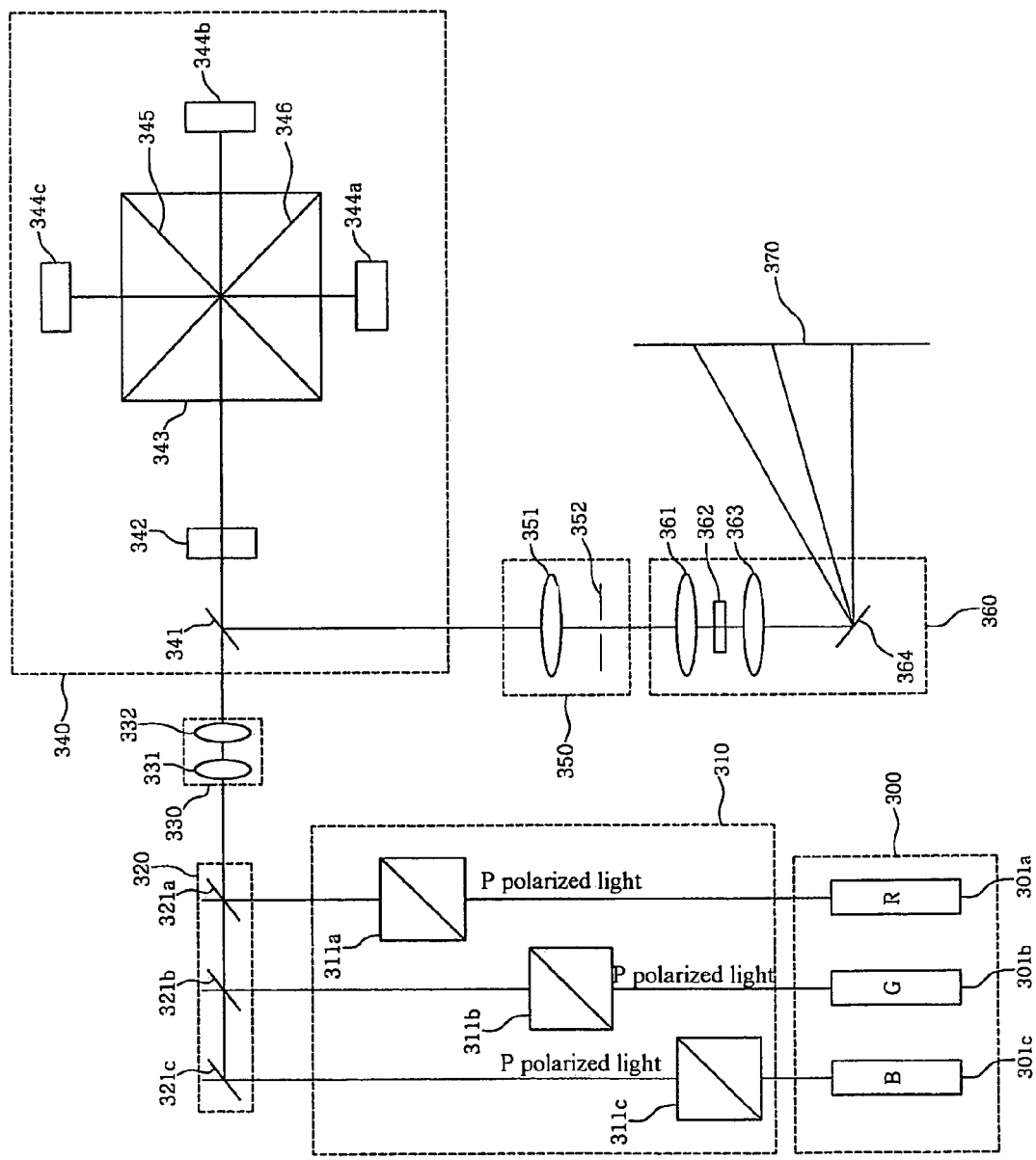
FIG. 3 shows the configuration of a color display device having a single illumination system according to an embodiment of the present invention.

FIG. 3 shows the configuration of a color display device having a single illumination system according to an embodiment of the present invention.

Referring to FIG. 3, the color display device having the single illumination system according to the embodiment of the present invention includes a light source system 300 composed of a plurality of light sources 301a to 301c, a polarizing unit 310 composed of a plurality of Polarized Beam Splitters (PBSs) 311a to 311c, a condenser unit 320 composed of one mirror 321c and a plurality of dichroic mirrors 321a and 321b, an illumination lens system 330 composed of a cylinder lens 331 and a collimator lens 332, an optical modulation system 340 composed of a PBS 341, a λ/4 wave plate 342, an X-prism 343 and a plurality of diffractive light modulators 344a to 344c, a filter system 350 composed of a projection lens 351 and a filter 352, a projection system 360 composed of a pair of projection lenses 361 and 363, a speckle remover 362 and a galvano mirror 364, and a screen 370.

The plurality of light sources 300 is composed of, for example, a red light source 301a, a blue light source 301b and a green light source 301c. The plurality of light sources 300 may be light sources that are formed of semiconductor devices such as LEDs or Laser Diodes (LDs). Such semiconductor light sources have many characteristics that are suitable for use in color display apparatuses compared to other light sources.

The PBSs 311a to 311c located in front of the light sources 301a to 301c, respectively, pass only the P or S polarized light of the incident light therethrough. In the present invention, a case where P polarized light is passed through the PBSs is described as an example.

The reflection mirror 321c of the condenser unit 320 reflects blue P polarized light, which is output from the blue light source 301c and passes through the PBS 311c, toward the illumination lens system 330. The dichroic mirror 321b transmits blue P polarized light incident from the reflection mirror 321c, but reflects green P polarized light, which is output from the green light source 301b and passes through the PBS 311b, toward the illumination lens system 330.

Further, the dichroic mirror 321a transmits blue P polarized light and green P polarized light, which are incident from the dichroic mirror 321b at the front part, but reflects P polarized light, which is incident from the red light source 301a through the PBS 311a, toward the illumination lens system 330a.

As described above, blue P polarized light, green P polarized light and red P polarized light are converged into a multi-beam by the reflection mirror 321c and the plurality of dichroic mirrors 321a and 321b, thereby forming the single illumination system.

The illumination lens system 330 then converts the converged multi-beam into linear parallel light, and causes it to be incident on the optical modulation system 340.

Figure 4A:
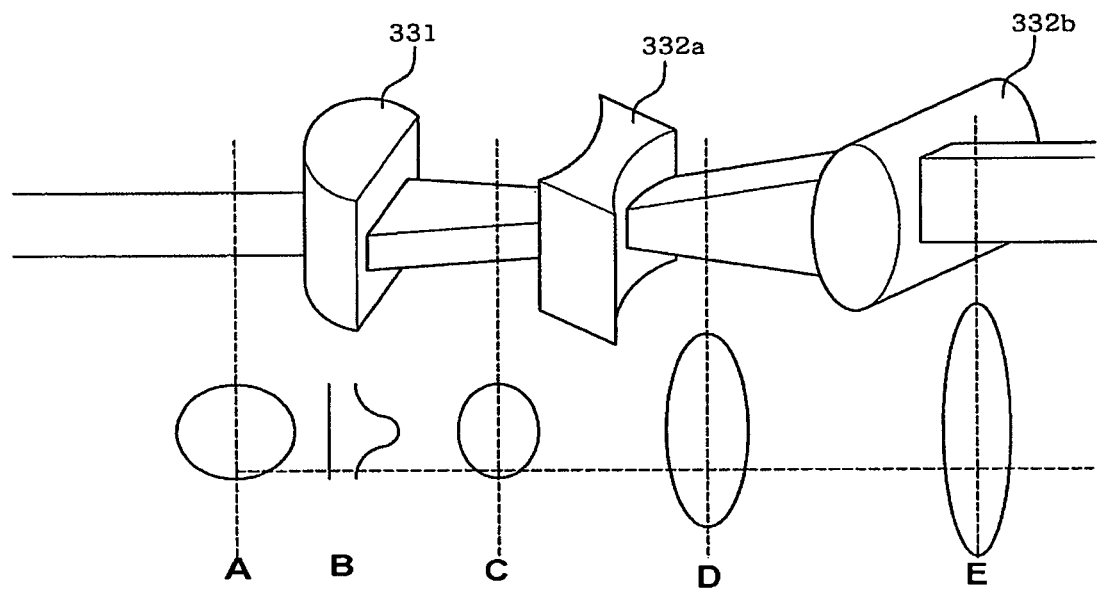
Figure 4B:
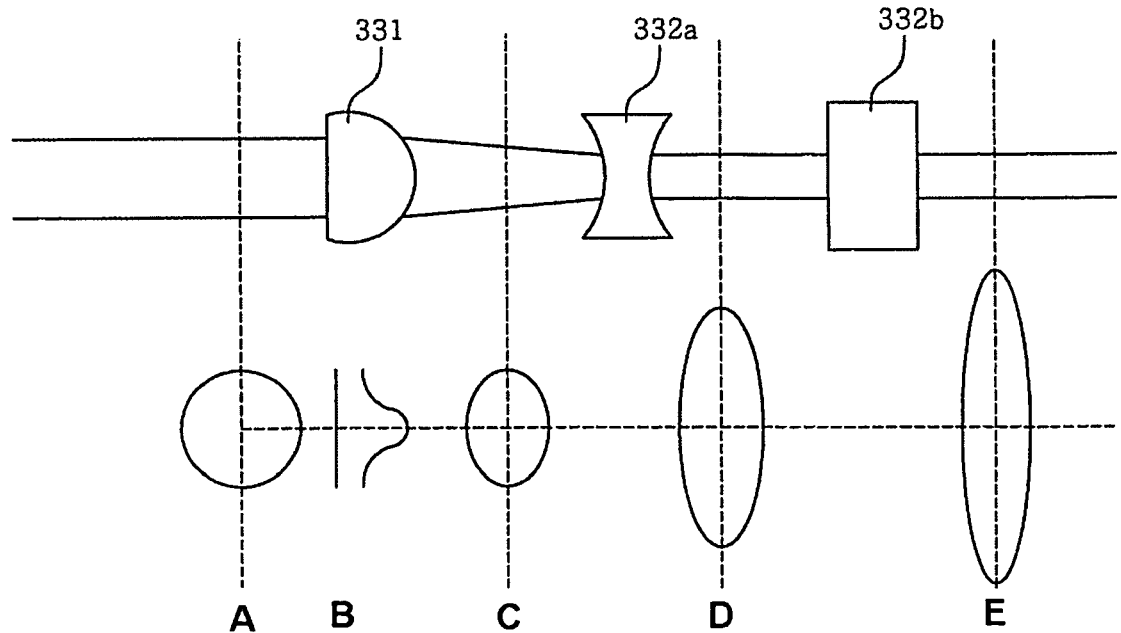

An example of a cross section of light used in this case is shown in "A" of FIG. 4A to 4C. As shown in "A" of FIG. 4A to 4C, the cross section of the light is circular. The intensity profile of light has Gaussian distribution, as shown in "B" of FIG. 4A to 4C.

The illumination lens system 330 converts incident light into linear parallel light having an elliptical cross section. The illumination lens system 330 includes a cylinder lens 331 and a collimator lens 332.

That is, the illumination lens system 330 converts the multi-beam, which is converged by the condenser unit 320, into linear light coplanar with an optical path, and causes the linear light to be incident on the diffractive light modulators 344a to 344c through the PBS 341, the λ/4 wave plate 342 and the X-prism 343.

In this case, in order for the light incident from the condenser unit 320 to be horizontally incident on corresponding diffractive light modulators 344a to 344c, which are located horizontally to the direction of the optical path, the cylinder lens 331 converts the parallel light into linear light of a horizontal direction, as shown in "C" of FIG. 4A to 4C, and then causes it to be incident on corresponding diffractive light modulators 344a to 344c through the collimator lens 332.

The collimator lens 332 can include, for example, a concave lens 332a and a convex lens 332b, as shown in FIG. 4A to 4C.

The concave lens 332a vertically stretches the linear light incident from the cylinder lens 331, as shown in "D" of FIG. 4A to 4C, and then causes it to be incident on the convex lens 332b. The convex lens 332b converts the incident light incident from the concave lens 332a into parallel light, as shown in "E" of FIG. 4A to 4C, and then outputs the parallel light. In FIG. 4A to 4C is a perspective view of an optical system including a light source, a cylinder lens and a collimator lens. FIG. 4A is a perspective view, FIG. 4B is a plan view of FIG. 4a, FIG. 4C is a side sectional view of FIG. 4A.

Meanwhile, the PBS 341 passes P polarized multi-beam, which is incident from the illumination lens system 330, therethrough. The λ/4 wave plate 342 delays the phase of the P polarized multi-beams by λ/4, and outputs the delayed light.

The first diagonal plane 345 of the X-prism 343 reflects blue P polarized light, and causes it to be incident on the blue color diffractive light modulator 344c, but passes green P polarized light and red P polarized light therethrough.

The second diagonal plane 346 of the X-prism 343 passes green P polarized light therethrough, and causes it to be incident on the green color diffractive light modulator 344b. The second diagonal plane 34 reflects red P polarized light, and causes it to be incident on the red diffractive light modulator 344a.

Each of the diffractive light modulators 344a to 344c diffracts linear light incident from the X-prism 343 to form diffracted light, and causes the formed diffracted light to be incident on the X-prism 343 again.

In this case, the diffraction angle of the diffracted light formed by the diffractive light modulators 344a to 344c is proportional to the wavelength. In this case, various types of diffractive light modulators may be used as the diffractive light modulators 344a to 344c. An open hole-type diffractive light modulator is shown in FIG. 5 as an example.

Figure 5:
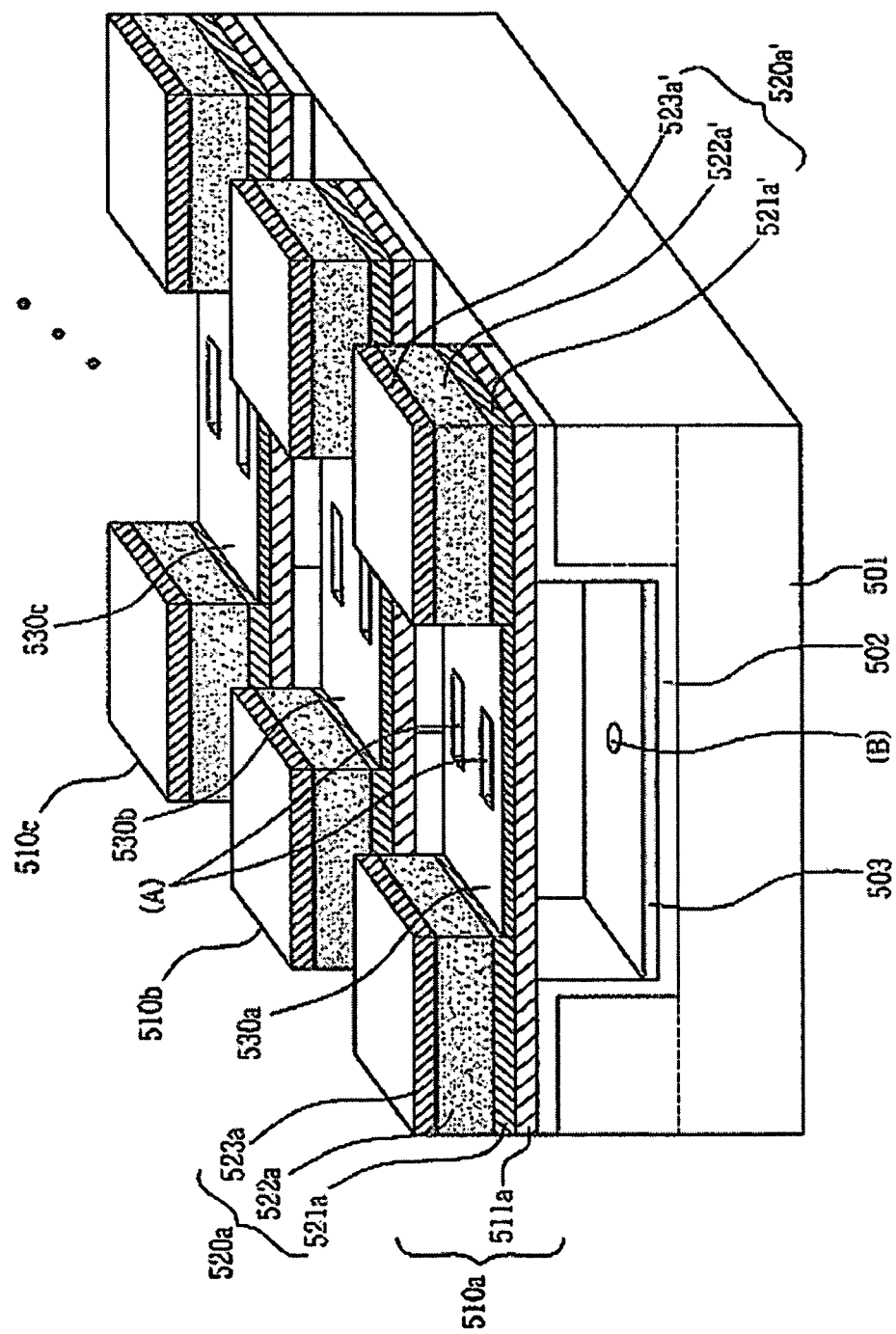
FIG. 5 is a perspective view illustrating the construction of the diffractive light modulator of FIG. 3.

Referring to FIG. 5, the open hole-type diffractive light modulator includes a silicon substrate 501, an insulating layer 502, a lower micro mirror 503, and a plurality of elements 510a to 510n. In this case, although the insulating layer and the lower micro mirror are separately constructed, the insulation layer itself can function as the lower micro mirror if it has a light-reflecting property.

The silicon substrate 501 is provided with a depressed portion to provide air spaces to the elements 510a to 510n. The insulation layer 502 is formed on the silicon substrate 501. The lower micro mirror 503 is deposited on the insulation layer 502 above the depressed portion of the silicon substrate 501. The bottoms of the elements 510a to 510n are attached to both sides of the insulation layer 502 beside the depressed portion of the silicon substrate 501. The silicon substrate 501 can be fabricated of a single material such as Si, $Al_2O_3$, $ZrO_2$, quartz or SiO2. The upper and lower layers (divided by dotted lines in FIG. 5) of the silicon substrate 501 can be fabricated of heterogeneous materials.

The lower micro mirror 503 is deposited above the silicon substrate 501, and diffracts incident light by reflecting it. The lower micro mirror 503 can be fabricated of a metallic material such as Al, Pt, Cr or Ag.

The element 510a (although only the element 510a is described herein, the remaining elements have the same construction and operation) has a ribbon shape. The element 510a includes a lower support 511a, both sides of the bottom of which are attached to both sides of the insulation layer 502 beside the depressed portion of the silicon substrate 501, so that the central portion of the lower support 511a is spaced apart from the depressed portion of the silicon substrate 501.

Piezoelectric layers 520a and 520a' are formed on both sides of the lower support 511a. Driving force is provided to the element 510a by the contraction and expansion of the piezoelectric layers 520a and 520a'.

The lower support 511a may be fabricated of Si oxide such as $SiO_2$, Si nitride such as $Si_3N_4$, a ceramic substrate such as Si, $ZrO_2$ and $Al_2O_3$, and Si carbide. However, the lower support 511a may be omitted when necessary.

Each of the piezoelectric layers 520a and 520a' includes a lower electrode layer 521a or 521a' configured to provide a piezoelectric voltage, a piezoelectric material layer 522a or 522a' formed on the lower electrode layer 521a or 521a' and configured to contract and expand and generate vertical driving force when voltage is applied to both surfaces thereof, and a upper electrode layer 523a or 523a' formed on the piezoelectric material layer 522a or 522a' and configured to provide a piezoelectric voltage to the piezoelectric material layer 522a or 522a'. When voltage is applied to the upper electrode layers 523a and 523a' and the lower electrode layers 521a and 521a', the piezoelectric material layers 522a and 522a' contract and expand, thus causing vertical movement of the lower support 511a.

The electrodes 521a, 521a', 523a and 523a' may be fabricated of a material such as Pt, Ta/Pt, Ni, Au, Al or $RuO_2$, and may be deposited by sputtering or evaporation to have a thickness within a range of 0.01 to 3 μm.

Meanwhile, an upper micro mirror 530a is deposited on the center portion of the top of the lower support 511a, and includes a plurality of open holes 531a1 and 531a2. In this case, the open holes 531a1 and 531a2 preferably have a rectangular shape, but may have any closed curve shape such as a circle or an ellipse. When the lower support 511a is fabricated of a light-reflective material, the upper micromirror 530a is not necessary. In this case, the lower support 511a may function as the upper micro mirror.

The open holes 531a1 and 531a2 pass light incident on the element 510a therethrough, and allow the light to be incident on the portion of the lower micro mirror 503 corresponding to the portion where the open holes 531a1 and 531a2 are formed, so that the lower micro mirror 503 and the upper micro mirror 530a can form a pixel.

That is, for example, the portion "A" of the upper micro mirror 530a where the open holes 531a1 and 531a2 are formed, and the portion "B" of the lower micro mirror 503 can form a single pixel.

In this case, the incident light, which passes through the portion where the open holes 531a1 and 531a2 of the upper micro mirror 530a are formed, can be incident on the corresponding portion of the lower micro mirror 503. When the distance between the upper micro mirror 530a and the lower micro mirror 503 is an odd multiple of λ/4, maximally diffracted light is produced. In addition, an open hole-type diffractive light modulator applicable to the present invention is disclosed in Korean Pat. Appl. No. 2004-030159.

Meanwhile, each of the open-hole diffractive light modulators 344a to 344c diffracts the linear light incident from the illumination lens system 330 to form the diffracted light, and causes the diffracted light to be incident on the X-prism 343, the λ/4 wave plate 342 and the PBS 341, as described above.

Figure 6:
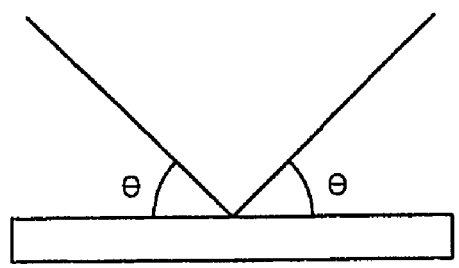
FIG. 6 is a view illustrating the reflection angle of the diffractive light modulator of FIG. 3.
Figure 7A:
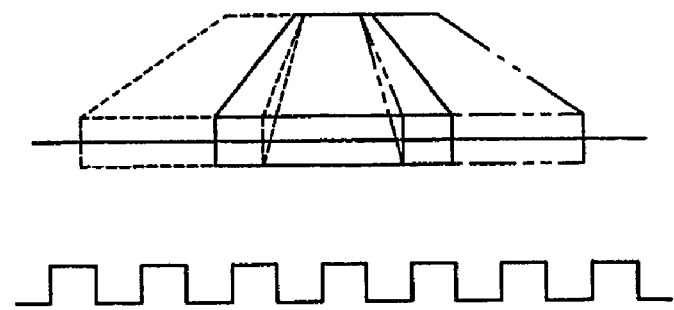
FIGS. 7A and 7B are schematic diagrams illustrating diffracted light generated by the diffractive light modulator of FIG. 3.
Figure 7B:
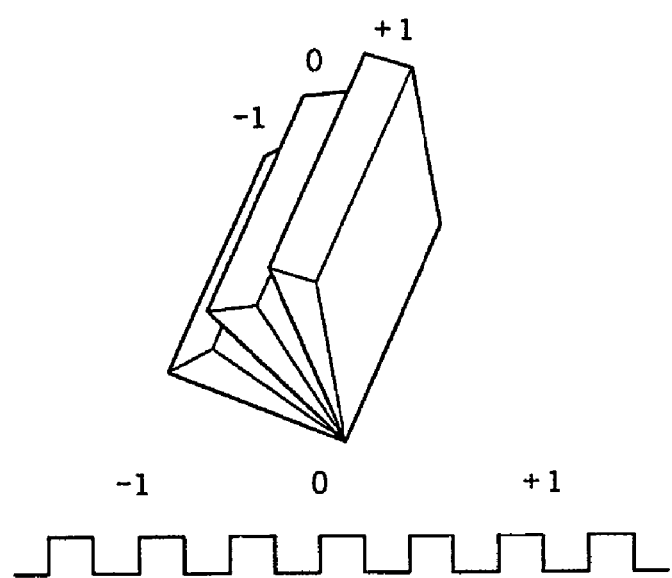

The reflection angle of the diffracted light formed as described above is shown in FIG. 6. From FIG. 6, it can be understood that the incidence angle and reflection angle of the diffracted light are the same. If the diffracted light is incident on the diffractive light modulators 344a to 344c at an angle of θ°, the reflection angle of the diffracted light is also θ°. In the present invention, the incidence angle is 90° and the reflection angle is also 90°. The diffracted light formed by the diffractive light modulators 344a to 344c is shown in FIGS. 7A and 7B. 0-order and ±1-order diffracted light beams are formed in the periodic direction of a grating. If the periodic direction of the grating is the same as a direction parallel to the linear parallel light, the diffracted light is formed as shown in FIG. 7A. If the periodic direction of the grating is the same as a direction perpendicular to the linear parallel light, the diffracted light is formed as shown in FIG. 7B.

Meanwhile, if diffracted light whose phase is delayed by λ/4 is received from the X-prism 343, the λ/4 wave plate 342 delays the phase of the light by λ/4, and outputs the delayed light. As a result, the light is delayed by λ/2 compared to initial illumination light, and P polarized light incident from the illumination lens system 330 becomes S polarized light.

Then, the PBS 341 that passes P polarized light therethrough but reflects S polarized light reflects the diffracted light of S polarized light, which is output from the X-prism 343, toward the filter system 350.

The filter system 350 preferably includes the Fourier lens 351 and the filter 352. The Fourier lens 351 separates incident diffracted light beams on an order basis. The filter 352 passes only diffracted light beams having desired orders therethrough.

In this case, if the diffracted light corresponds to the case of FIG. 7A, dichroic filters (FIGS. 9A to 9E) are used. If the diffracted light corresponds to the case of FIG. 7B, a dichroic filter (FIG. 10) is used.

Figure 8A:
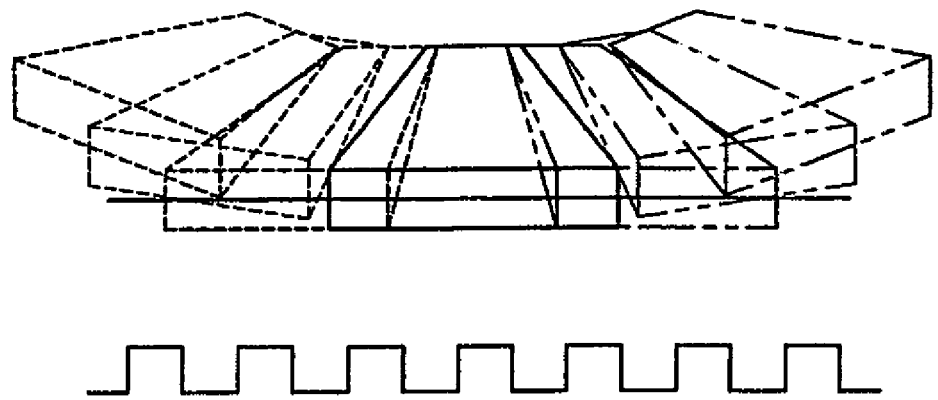
FIGS. 8A to 8D are views showing optical paths formed through the filter system.
Figure 8B:
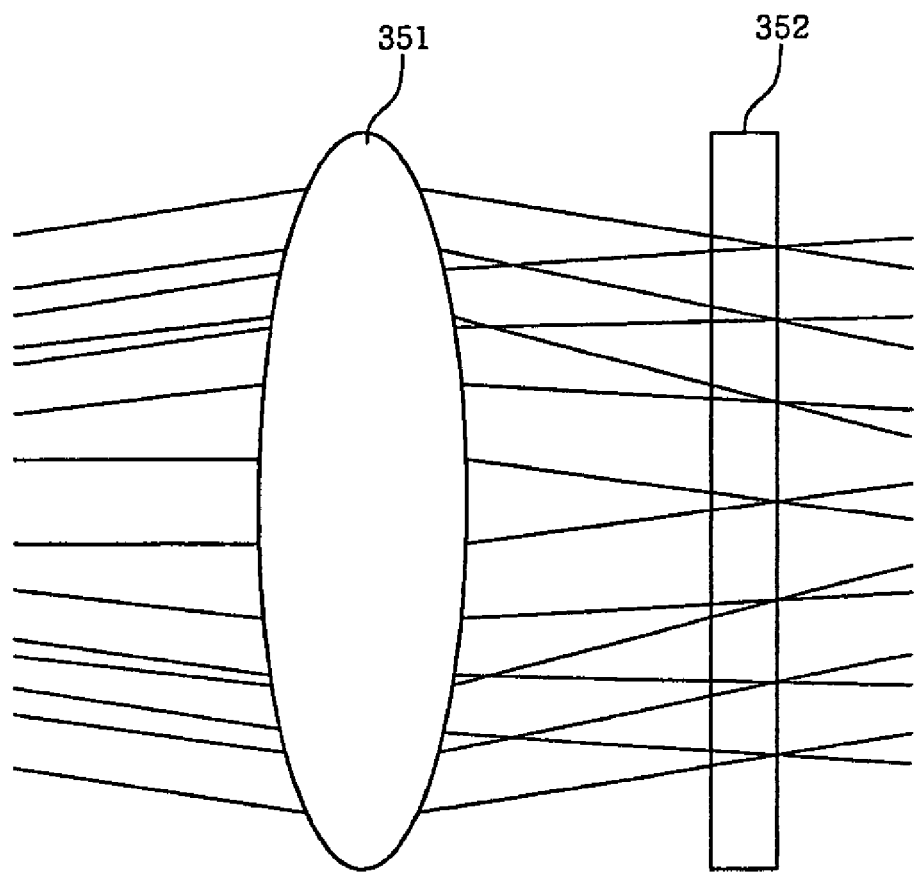

That is, in FIGS. 8A and 8B, in the case of the diffracted light shown in FIG. 7A, the 0- and ±1-order diffracted light are formed in the periodic direction of the grating. In this case, the diffracted light of incident light having a larger wavelength is bent away. As a result, +1-order R diffracted light, +1-order G diffracted light, +1-order B diffracted light, 0-order R diffracted light, 0-order G diffracted light, 0-order B diffracted light, −1-order B diffracted light, −1-order G diffracted light, and −1-order R diffracted light are formed sequentially from the left sides of FIGS. 8A and 8B.

The filter system 350 includes the Fourier lens 351 and the dichroic filter 352, and selectively passes 0-order diffracted light or ±1-order diffracted light of incident diffracted light therethrough.

The Fourier lens 351 converges diffracted light having each diffraction order. The dichroic filter 352 passes only diffracted light having desired orders therethrough.

The dichroic filter 352 is well illustrated in FIGS. 9A to 9E. The dichroic filter 352 receives multi-diffracted light beams, which are radiated through the Fourier lens 351. Thereafter, the dichroic filter 352 passes only some of the multi-diffracted light beams having predetermined diffraction coefficients, more particularly, the 0-, +1- and −1-order diffraction coefficients, therethrough, and then outputs the passed multi-diffracted light beams to the projection system 360.

Figure 9A:
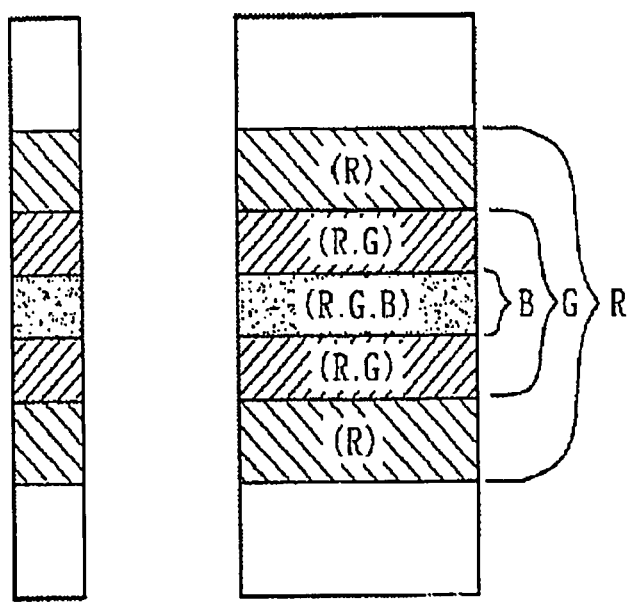
FIGS. 9A to 9E are views showing examples of the dichroic filter of FIG. 3.

In this case, the side and front views of the dichroic filter 352 are shown in FIG. 9A, which shows a 0-order diffraction filter. In this filter, a region B is coated with a material that transmits 0-order diffracted light beams having a red, green or blue color. The portions of a region G that do not overlap the region B are coated with a material that transmits 0-order diffracted light beams having a green or red color. The portions of a region R that do not overlap the regions B and G are coated with a material that transmits only a 0-order diffracted light beam having a red color. Furthermore, the other portions are coated with a material that does not transmit light beams having a blue, green or red color.

Figure 9B:
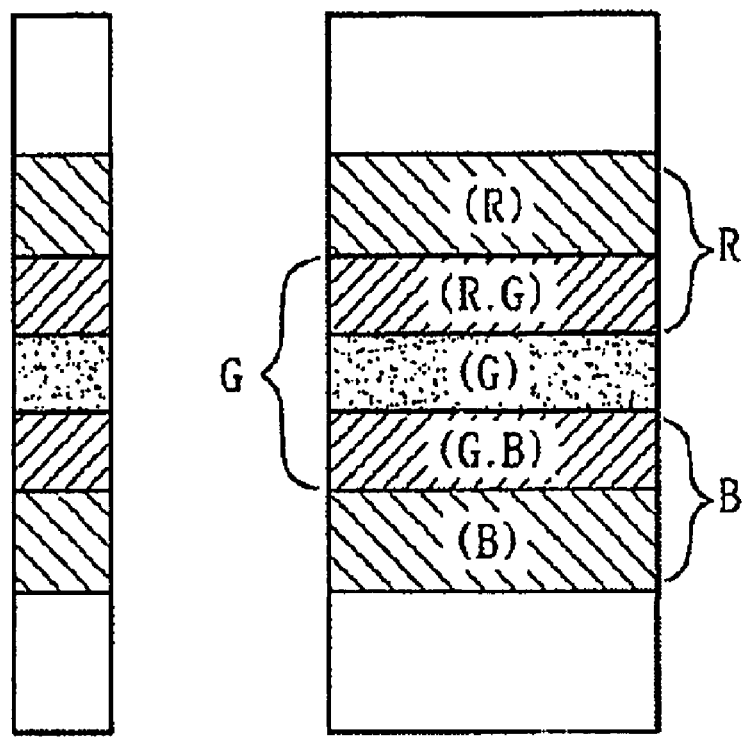

A ±1-order filter is shown in FIG. 9B. The portion of a region R that does not overlap a region G is coated with a material that transmits ±1-order diffracted light beams having a red color. The portions where the regions R and G overlap each other are coated with a material that transmits ±1-order diffracted light beams having a red or green color. The portion of the region G that does not overlap the region R or the region B is coated with a material that transmits ±1-order diffracted light beams having a green color. The portion of the region G that overlaps the region B is coated with a material that transmits ±1-order diffracted light beams having a green or blue color. The portion of the region B that does not overlap the region G is coated with a material that transmits only ±1-order diffracted light beams having a blue color.

Figure 9C:
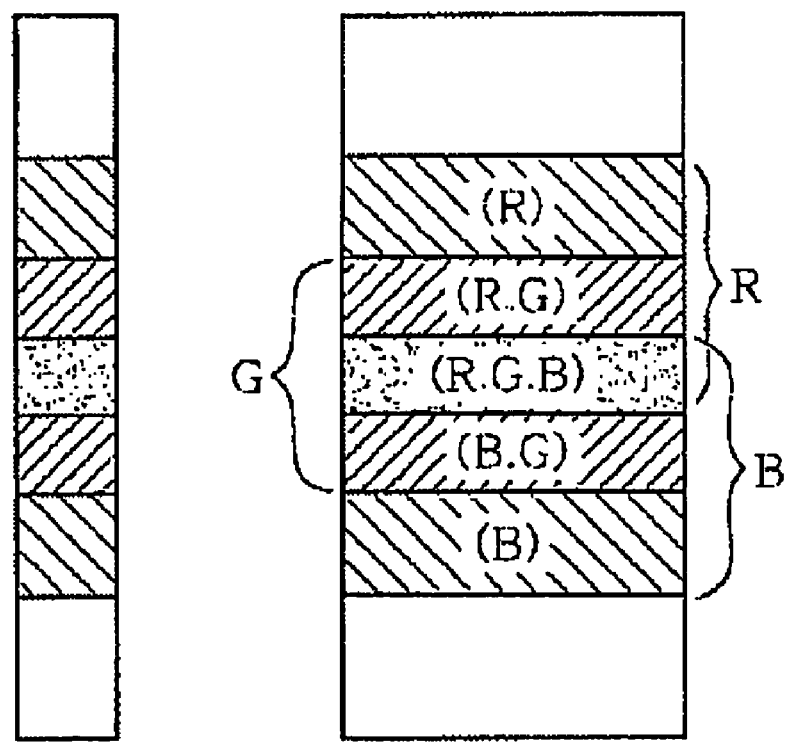

Furthermore, another ±1-order filter is shown in FIG. 9C. The portion of a region R that does not overlap a region G is coated with a material that transmits ±1-order diffracted light beams having a red color. The portions where only the regions R and G overlap each other are coated with a material that transmits ±1-order diffracted light beams having a red or green color. The portion where regions R, G and B overlap one another is coated with a material that transmits ±1-order diffracted light beams having a red, green or blue color.

The region G is composed of the portion that overlaps only the region R, and the portion that overlaps the regions R and B, and the portion that overlaps only the region B. The region B is also composed of the portion that overlaps the region G and the region R, the portion that overlaps only the region G, and the portion that transmits diffracted light beams having a blue color.

As described above, if the dichroic filter 352 is used, filtering can be performed on light beams having a plurality of wavelengths using a single filter, so that the light beams can be separated on an order basis. An interval between filters can be determined according to the following Equation 1.

$$D=\lambda/\Lambda * f(\lambda) \tag{1}$$

where D is the distance between filters, λ is the waveform of a light source, Λ is the cycle of a diffraction grating, and f(λ) is the focus distance of the Fourier lens 351 that varies depending upon the wavelength. Accordingly, in the case of the 0-order filter and the ±1-order filter, a transmission pattern and a reflection pattern are opposite to each other.

Figure 9D:
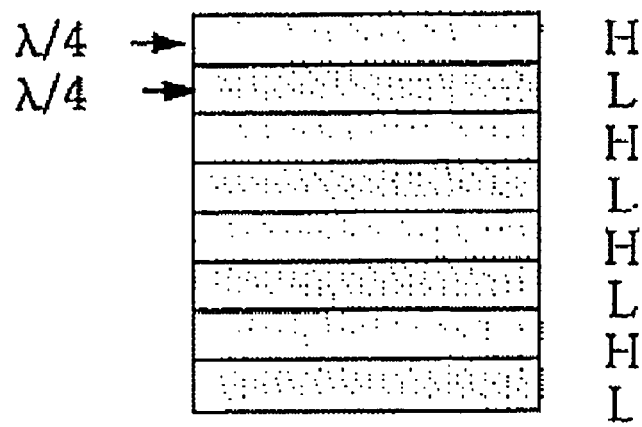
Figure 9E:
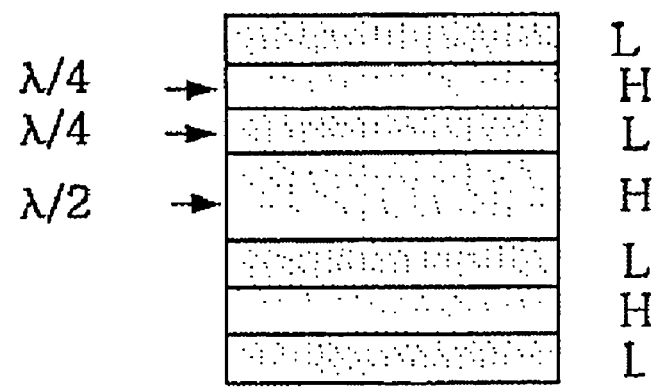

Meanwhile, the dichroic filter 352 may employ a high reflectance scheme or a high transmittance scheme. For the high transmittance scheme, if two types of media having a high refractive index and a low refractive index, respectively, are alternately multi-coated so that each layer has an optical thickness of λ/4 as shown in FIG. 9D, the dichroic filter 352 can have high transmittance. For the high reflectance scheme, if two types of media having a high refractive index and a low refractive index, respectively, are alternately multi-coated so that each layer has an optical thickness of λ/4, with a medium with a high refractive index being located at the center of the dichroic filter 352 and having an optical thickness of λ/2, and with media with a low refractive index being located at both ends of the dichroic filter 352, so that layers are symmetrical to each other as shown in FIG. 9E, the dichroic filter 352 can have high transmittance. Materials used as the medium having a high refractive index include $TiO_2$, ZnO, $Ta_2O_5$, $SrTiO_3$, $HfO_2$, $CeO_2$ and ZnS. However, ZnS is chiefly used, and has a refractive index in the range of about 2.3 to 2.4.

Materials used as the medium having a low refractive index include $SiO_2$, $MgF_2$, NaF, LiF, $CaF_2$, $AlF_3$ and cryolite{$AlF_3(NaF)_3$}. However, $MgF_2$ is chiefly used.

Figure 8C:
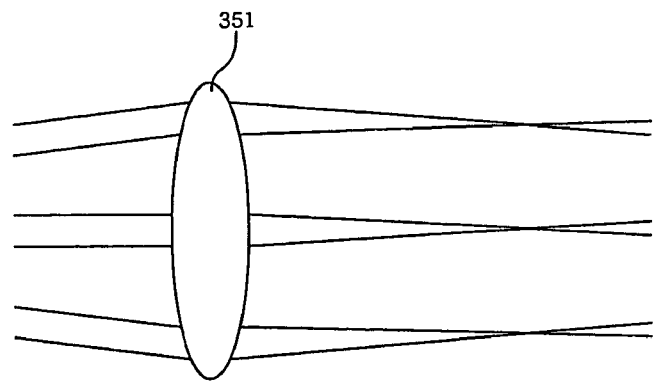
Figure 8D:
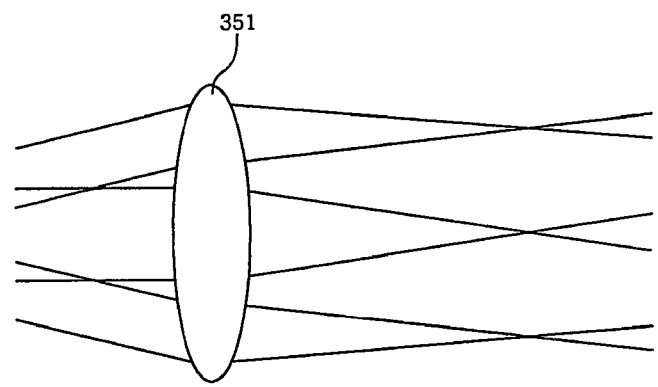

Meanwhile, FIGS. 8C and 8D are sectional views showing that light diffracted as in FIG. 7B passes through the PBS 341. From FIGS. 8C and 8D, it can be understood that the 0-order diffracted light and the ±1-order diffracted light overlap each other. Therefore, the Fourier lens 351 needs to separate the 0-order diffracted light and the ±1-order diffracted light from each other. After the 0-order diffracted light and the ±1-order diffracted light are separated, a mechanical filter (FIG. 10) can filter only diffracted light having desired orders.

Referring to FIG. 8C, if three beams having different wavelengths are incident on the Fourier lens 351, the Fourier lens 351 focuses the beams.

Figure 10:
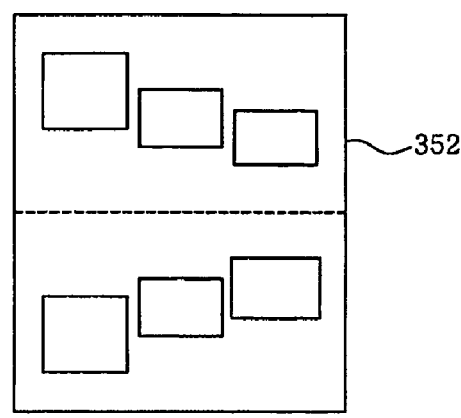
FIG. 10 is a front view illustrating the filter unit of FIG. 3.

Further, FIG. 8D shows a lateral cross section of any one of the three beams. The 0-order diffracted light is focused on a specific point after passing through the projection lens 351. In this case, the +1-order diffracted light is focused on a location above a location on which the 0-order diffracted light is focused, and the −1-order diffracted light is focused on a location below the location on which the 0-order diffracted light is focused. If the spatial filter 352 is located at a location near the focal points, only diffracted light having desired orders can be passed through the spatial filter 352. The front view of the spatial filter 352 used in this case is shown in FIG. 10. Since the distance of the +1-order diffracted light from the center of the spatial filter 352 and the distance of the −1-order diffracted light from the center of the spatial filter 352 are different for each wavelength, the +1-order diffracted light and the −1-order diffracted light can be separated from each other using the spatial filter 352.

The projection system 360 includes the pair of the projection lenses 361 and 363, and the speckle remover 362, and projects incident diffracted light onto the screen 370. That is, the projection system 360 focuses diffraction light having predetermined diffraction coefficients, which is incident through the filter system 350, on the screen 370, thus forming a spot.

As described above, when polarized beams are employed in accordance with the present invention, a simple optical system can be constructed and a color image can be implemented using the simple optical system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A display device, comprising:
   a condenser unit for converging polarized light output from a plurality of light sources, and outputting the converged polarized light;
   an illumination lens system for converting the polarized light, which is output from the condenser unit, into linear parallel light;
   an optical modulation system for producing diffracted light beams having a plurality of diffraction orders by optically modulating the polarized light having each wavelength that is output from the illumination lens system;
   a filter system for passing some of the diffracted light beams having desired orders therethrough;
   a projection system for focusing the diffracted light beams passed through the filter system, and projecting the focused diffracted light beams onto a screen, and
   wherein the optical modulation system includes:
      a plurality of diffractive light modulators for producing the diffracted light beams having the plurality of diffraction orders by optically modulating the polarized light having each wavelength that is output from the illumination lens system;
      a diffracted light separator for passing polarized beams, which are output from the illumination lens system, therethrough, and reflecting the diffracted light beams, which are output from the diffractive light modulators, toward the filter system; and
      a polarized beam separator for separating the polarized beams incident from the diffracted light separator on a wavelength basis and then causing the separated polarized beams to be incident on corresponding diffractive light modulators, and converging the diffracted light beams output from the plurality of diffractive light modulators and then outputting the converged light beams to the diffracted light separator.

2. The display device as set forth in claim 1, wherein the diffracted light separator includes:
   a λ/4 wave plate for shifting the phase of each of the polarized beams incident from the illumination lens system by λ/4 when a wavelength of the incident light is λ and then outputting the shifted polarized beam to the polarized beam separator, and shifting the phase of the polarized beam incident from the polarized beam separator by λ/4 when the wavelength of the incident light is λ and then outputting the shifted polarized beam to the filter system; and
   a Polarized Beam Splitter (PBS) for causing the polarized beam output from the illumination lens system to be incident on the λ/4 wave plate, and reflecting diffracted light, which is shifted by λ/2 compared to the polarized beam output from the λ/4 wave plate, toward the filter system.

3. The display device as set forth in claim 1, wherein the polarized beam separator is an X-prism.

* * * * *